(12) United States Patent
Gasser et al.

(10) Patent No.: US 9,542,274 B2
(45) Date of Patent: Jan. 10, 2017

(54) SYSTEM AND METHODS OF MANAGING CONTENT IN ONE OR MORE NETWORKED REPOSITORIES DURING A NETWORK DOWNTIME CONDITION

(71) Applicant: Lexmark International, Inc., Lexington, KY (US)

(72) Inventors: Otto Hunter Gasser, Birmingham, AL (US); Jeffrey Allen Romatoski, Woodbury, MN (US); Razvan Atanasiu, Victoria, MN (US)

(73) Assignee: Lexmark International Technology Sarl, Meyrin (CH)

( * ) Notice: Subject to any disclaimer, the term of this patent is extended or adjusted under 35 U.S.C. 154(b) by 273 days.

(21) Appl. No.: 14/145,167

(22) Filed: Dec. 31, 2013

(65) Prior Publication Data
US 2014/0379838 A1    Dec. 25, 2014

Related U.S. Application Data

(60) Provisional application No. 61/837,888, filed on Jun. 21, 2013.

(51) Int. Cl.
| | | |
|---|---|---|
| *G06F 15/167* | (2006.01) | |
| *G06F 11/14* | (2006.01) | |
| *H04L 29/08* | (2006.01) | |

(52) U.S. Cl.
CPC ....... *G06F 11/1448* (2013.01); *H04L 67/2842* (2013.01)

(58) Field of Classification Search
USPC .............. 709/213, 217, 218, 223, 225, 226
See application file for complete search history.

(56) References Cited

U.S. PATENT DOCUMENTS

| | | | |
|---|---|---|---|
| 8,296,375 B1 | 10/2012 | Katzer et al. | |
| 8,769,055 B2* | 7/2014 | Murphy | G06F 11/1451 |
| | | | 707/634 |
| 2002/0038296 A1 | 3/2002 | Margolus et al. | |
| 2004/0031052 A1 | 2/2004 | Wannamaker et al. | |
| 2004/0107319 A1 | 6/2004 | D'Orto et al. | |
| 2006/0047776 A1* | 3/2006 | Chieng | G06F 11/203 |
| | | | 709/217 |
| 2008/0208625 A1 | 8/2008 | Joseph | |
| 2010/0030730 A1 | 2/2010 | Shang et al. | |
| 2010/0082548 A1 | 4/2010 | Crockett et al. | |
| 2010/0256994 A1 | 10/2010 | Eisenberger et al. | |
| 2010/0257190 A1 | 10/2010 | Farkash et al. | |
| 2010/0281041 A1* | 11/2010 | Almeida | G06F 17/30867 |
| | | | 707/755 |
| 2011/0087706 A1 | 4/2011 | Gole et al. | |
| 2012/0221354 A1 | 8/2012 | Wall | |

(Continued)

FOREIGN PATENT DOCUMENTS

| | | | |
|---|---|---|---|
| WO | WO 9853410 A2 | 11/1998 | |
| WO | WO9922316 A1 | 5/1999 | |

OTHER PUBLICATIONS

Rita Noumeir et al.: "IHE cross-enterprise document sharing for imaging: interoperability testing software", Source Code For Biology And Medicine, Biomed Central Ltd, L0, vol. 5, No. 1, p. 9, Sep. 21, 2010.

(Continued)

*Primary Examiner* — Liangche A Wang (57) ABSTRACT

A method of managing content in a network by a cache repository that includes receiving content from a content source; storing the content in the cache repository; sending the content to a remote repository for storage; and determining if a connection to the remote repository can be established in the network. If the connection to the remote repository can be established, the method includes retrieving the content from the remote repository; and if the connection to the remote repository cannot be established, the method retrieves the content from a backup repository.

19 Claims, 4 Drawing Sheets

(56) References Cited

U.S. PATENT DOCUMENTS

| | | |
|---|---|---|
| 2012/0303896 A1 | 11/2012 | McGroddy-Goetz et al. |
| 2012/0311062 A1 | 12/2012 | Frydman et al. |
| 2013/0041914 A1 | 2/2013 | Hadlock et al. |
| 2013/0097457 A1 | 4/2013 | Drucker et al. |
| 2013/0218917 A1 | 8/2013 | Bell |
| 2013/0305039 A1* | 11/2013 | Gauda ............... G06F 21/6218 713/153 |
| 2014/0047263 A1* | 2/2014 | Coatney ............ G06F 11/2023 714/4.11 |

OTHER PUBLICATIONS

H. Nelken: "Cross Enterprise Document Sharing—A Standards-Based Solution for National Level Document Sharing", pp. 1-8, Sector Technical Institute, Montpelier, Jan. 1, 2006.

Marco Eichelberg et al. : "A Survey and Analysis of Electronic Healthcare Record Standards", ACM Computing Surveys, ACM, New York, N.Y., US, vol. 37, No. 4, pp. 277-315, Dec. 1, 2005.

M. E. Wo: "HIIG: A Standards-based Framework for Medical Image and Patient Data Archiving and Interoperability", Frost & Sullivan White Paper, Nov. 1, 2008.

H. Jasper: "Active Databases for Active Repositories", International Conference on Data Engineering, XX, XX, pp. 375-384, Jan. 1, 1994.

* cited by examiner

SYSTEM AND METHODS OF MANAGING CONTENT IN ONE OR MORE NETWORKED REPOSITORIES DURING A NETWORK DOWNTIME CONDITION

CROSS REFERENCES TO RELATED APPLICATIONS

The present application is related to and claims priority under 35 U.S.C. 119(e) from U.S. Provisional Patent Application Ser. No. 61/837,888, filed Jun. 21, 2013, entitled, "System and Methods of Managing Content in One or More Repositories," the contents of which is hereby incorporated by reference in its entirety. The present application is related to U.S. patent application Ser. No. 14/145,134, entitled "System and Methods of Managing Content in One or More Repositories," and U.S. patent application Ser. No. 14/145,145, entitled, "System and Methods of Pre-Fetching Content in One or More Repositories," both filed contemporaneously herewith and assigned to the assignee of the present application.

STATEMENT REGARDING FEDERALLY SPONSORED RESEARCH OR DEVELOPMENT

None.

REFERENCE TO SEQUENTIAL LISTING, ETC

None.

BACKGROUND

1. Technical Field

The present disclosure relates generally to methods for managing one or more documents in a repository and, more specifically, to managing the documents in a plurality of repositories connected to a primary system that replicates to a backup system.

2. Description of the Related Art

Cross-Enterprise Document Sharing (XDS) is a technical framework defined by Integrating Healthcare Environments (IHE) that facilitates the registration, distribution and access of patient electronic health records across health enterprises. It provides a standards-based specification for managing the sharing of documents between any healthcare enterprises.

Healthcare enterprises that widely use XDS for managing the sharing of health records include distinct entities having one or more separate responsibilities such as, for example, a private physician office, an acute care in-patient facility, a clinic and/or personal health record (PHR) systems. Since XDS is largely an architecture that relies on a stable network connection to share and access electronic health records from various healthcare enterprises, there is a risk for an XDS system that is currently in use to be inaccessible due to partial and/or complete site failures.

A partial system failure occurs when one or more, but not all, elements in the network operating the system are compromised. It can be caused by a software, hardware or and/network failure, which in turn causes a database management system (DBMS) server to be inaccessible for an unpredictable amount of time. A complete system failure may occur when a calamity, such as a fire, causes an entire system to be destroyed and rendered useless.

When either a partial or complete site failure occurs, XDS components, such as databases that contain information needed by healthcare enterprises, may become unavailable to users that need to store or retrieve data. The length of time it takes for the system to get back to an uptime condition and in a consistent state is unpredictable and the breakdown in functions and operations may cause loss of important documents and/or delays in the processing of valuable electronic medical records. The typical XDS architecture that is structured to share documents across healthcare enterprises may also contain gaps when implementing mission critical XDS for a healthcare enterprise with multiple facilities that require storage management, high availability (HA) and disaster recovery (DR).

Accordingly, there is a need for an XDS architecture that fills in these gaps and that allows for efficient and robust operation of XDS across a domain of healthcare enterprises. There is also a need for an XDS architecture that is able to provide a high availability and/or disaster recovery solution for partial and/or complete site failures and allow flexibility during network downtime wherein users still have access to pertinent files and important medical records when needed.

XDS that is used in a fairly large domain of healthcare enterprises also tends to store a huge amount of data and information in its database server(s), which grows over time. When the size of the database needed to hold information becomes larger, the cost needed to maintain it also increases. Accordingly, there is also a need for an XDS solution for an improved, more efficient, and less expensive management of data. A solution to improve speed when accessing one or more files from a repository in an XDS architecture is also needed in order to increase efficiency and reliability of data management within the group of healthcare enterprises.

SUMMARY

A system capable of and methods of managing content in one or more networked repositories during network downtime condition are disclosed.

One example method of managing content in a network by a cache repository includes receiving content from a content source; storing the content in the cache repository; sending the content to a remote repository for storage; and determining if a connection to the remote repository can be established in the network. If the connection to the remote repository can be established, the example method includes retrieving the content from the remote repository; and if the connection to the remote repository cannot be established, the example method retrieves the content from a backup repository.

One example system of managing content in one or more networked repositories during a network downtime condition includes a cache repository for storing content received from a source; a registry for registering the content using the metadata; a central repository for receiving and storing the content from the cache repository; and a backup repository for storing a backup of the content received and stored in the central repository. If a connection to the central repository can be established, a content consumer retrieves content from the central repository; and if a connection to the central repository cannot be established, the content consumer retrieves the content from the backup repository.

From the foregoing disclosure and the following detailed description of various example embodiments, it will be apparent to those skilled in the art that the present disclosure provides a significant advance in the art of methods for enabling network-based processes in a device during a network downtime condition. Additional features and advantages of various example embodiments will be better understood in view of the detailed description provided below.

BRIEF DESCRIPTION OF THE DRAWINGS

The above-mentioned and other features and advantages of the present disclosure, and the manner of attaining them, will become more apparent and will be better understood by reference to the following description of example embodiments taken in conjunction with the accompanying drawings. Like reference numerals are used to indicate the same element throughout the specification.

DETAILED DESCRIPTION OF THE DRAWINGS

It is to be understood that the disclosure is not limited to the details of construction and the arrangement of components set forth in the following description or illustrated in the drawings. The disclosure is capable of other example embodiments and of being practiced or of being carried out in various ways. For example, other example embodiments may incorporate structural, chronological, process, and other changes. Examples merely typify possible variations. Individual components and functions are optional unless explicitly required, and the sequence of operations may vary. Portions and features of some example embodiments may be included in or substituted for those of others. The scope of the disclosure encompasses the appended claims and all available equivalents. The following description is, therefore, not to be taken in a limited sense, and the scope of the present disclosure is defined by the appended claims.

Also, it is to be understood that the phraseology and terminology used herein is for the purpose of description and should not be regarded as limiting. The use herein of "including," "comprising," or "having" and variations thereof is meant to encompass the items listed thereafter and equivalents thereof as well as additional items. Further, the use of the terms "a" and "an" herein do not denote a limitation of quantity but rather denote the presence of at least one of the referenced item.

In addition, it should be understood that example embodiments of the disclosure include both hardware and electronic components or modules that, for purposes of discussion, may be illustrated and described as if the majority of the components were implemented solely in hardware.

It will be further understood that each block of the diagrams, and combinations of blocks in the diagrams, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus may create means for implementing the functionality of each block or combinations of blocks in the diagrams discussed in detail in the description below.

These computer program instructions may also be stored in a non-transitory computer-readable medium that may direct a computer or other programmable data processing apparatus to function in a particular manner, such that the instructions stored in the computer-readable medium may produce an article of manufacture, including an instruction means that implements the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus implement the functions specified in the block or blocks.

Accordingly, blocks of the diagrams support combinations of means for performing the specified functions, combinations of steps for performing the specified functions and program instruction means for performing the specified functions. It will also be understood that each block of the diagrams, and combinations of blocks in the diagrams, can be implemented by special purpose hardware-based computer systems that perform the specified functions or steps, or combinations of special purpose hardware and computer instructions.

Disclosed are a system and methods for preventing failure or a breakdown in operations during one of a partial or complete system failure. The system and methods also allow a more efficient management and handling of content on a network of enterprises such as, for example, health enterprises operating on an XDS architecture. Methods are disclosed wherein content sources submit content packages having metadata to a repository. The repository then registers the content metadata to an associated registry. Content consumers in the system may also search for content having specific information. The content consumers may then retrieve desired content from the repository using the content metadata on the associated registry.

A system of one or more edge facilities in an affinity domain is disclosed. The system may include a single XDS registry connected to multiple XDS repositories from one or more edge facilities. The XDS repositories may transmit content to a central active repository on a primary system connected to the XDS facilities for long-term storage of content. In one alternative example embodiment, the central active repository may replicate content and metadata to a backup repository and registry located in a secondary system. In another example embodiment, if an XDS repository on an edge facility is unable to connect to the central active repository of the primary system to retrieve content, the XDS repository may connect to a secondary system to retrieve a backup copy of the content and/or access backup metadata associated with the content. The secondary system may also replicate content and metadata to the primary system when the central active repository is back to an uptime condition in order to sync stored information between the two systems.

Methods for enabling a scalable system are disclosed that allow XDS repositories to delete content after a specified number of days in order to efficiently utilize data storage. In one example embodiment, deleting the content may be performed after the content has been transferred and stored in the central active repository. Methods are disclosed for prefetching content in an edge facility. According to one example embodiment, prefetching content include retrieving content from at least one of a central active repository in the primary system and a backup repository in secondary system, and transmitting the retrieved content to a content consumer prior to a request by the content consumer for the content. Retrieval of the content may be performed based on one or more broadcasted HL7 messages.

For purposes of the present disclosure, it will be appreciated that the content may refer to files such as, for example, documents, image files, and audio files. Content may refer to paper-based records converted into digital files to be used by a computing device. Content may also refer to information that provides value for an end-user or a content consumer in one or more specific contexts. Content may be shared via one or more media such as, for example, computing devices in a network.

In some example embodiments, content may refer to computerized medical records, or electronic medical records (EMR), created in a health organization, or any organization that delivers patient care such as, for example, a physician's office, a hospital, or ambulatory environments. EMR may include orders for drug prescriptions, orders for tests, patient admission information, imaging test results, laboratory results, and clinical progress information, among others.

Content may also refer to an electronic health record (EHR) which may be a digital content capable of being distributed, accessed or managed across various health care settings. EHRs may include various types of information such as, for example, medical history, demographics, immunization status, radiology images, medical allergies, personal states (e.g., age, weight, etc.), vital signs and billing information. EHR and EMR may also be referred to as an electronic patient record (EPR). The terms EHR, EPR, EMR, document, and content may be used interchangeably for illustrative purposes throughout the present disclosure.

In another example embodiment, content may also refer to Digital Imaging and Communications in Medicine (DICOM) images. DICOM is a standard or specification for transmitting, storing, printing and handling information in medical imaging. Medical imaging, as will be known in the art, may refer to a process and/or technique used to generate images of the human body, or parts or functions thereof, for medical and/or clinical purposes such as, for example, to diagnose, reveal or examine a disease. The standard set by DICOM may facilitate interoperability of various medical imaging equipment across a domain of health enterprises by specifying and/or defining data structures, workflow, data dictionary, compression and workflow, among other things, for use in generating, transmitting and accessing the images and related information stored on the images. DICOM content may refer to medical images following the file format definition and network transmission protocol as defined by DICOM. DICOM content may include a range of biological imaging results and may include images generated through radiology and other radiological sciences, nuclear medicine, thermography, microscopy and medical photography, among many others. DICOM content may be referred to hereinafter as images following the DICOM standard, and non-DICOM content for other forms and types of content, as will be known in the art.

Content may be generated and maintained within an institution such as, for example, an integrated delivery network, hospital, physician's office or clinic, to provide patients and health care providers, insurers or payers access to records of a patient across a number of facilities. Sharing of content may be performed using network-connected enterprise-wide information systems, and other similar information exchanges or networks, as will be known in the art.

Metadata may refer to information regarding the content (e.g. DICOM and/or non-DICOM content). Metadata may provide information regarding the content such as, for example, information or data about a DICOM image, including dimensions, size, modality used to create the data, bit depth, and settings of the medical imaging equipment used to capture the DICOM image. Non-DICOM content may also contain metadata that provides information related to the content. Non-DICOM content metadata may include information such as, for example, a list of a patient's medical history, demographics, immunization status, radiology images, medical allergies, basic patient information, (e.g. age, weight, etc.), vital signs and billing information.

Content metadata may also refer to "content about content," or "information about content," that allows users to identify the content. Examples of content metadata may include means of content creation, purposes of the content, time and date of content creation, creator of the content, author of the content, standards used in generating the content, origin of the content, and information regarding history of the content (e.g., modification history). Content metadata may be used to search, access, modify or delete content stored in a database. Metadata may be stored and managed in a database such as, for example, a metadata registry.

Figure 1:
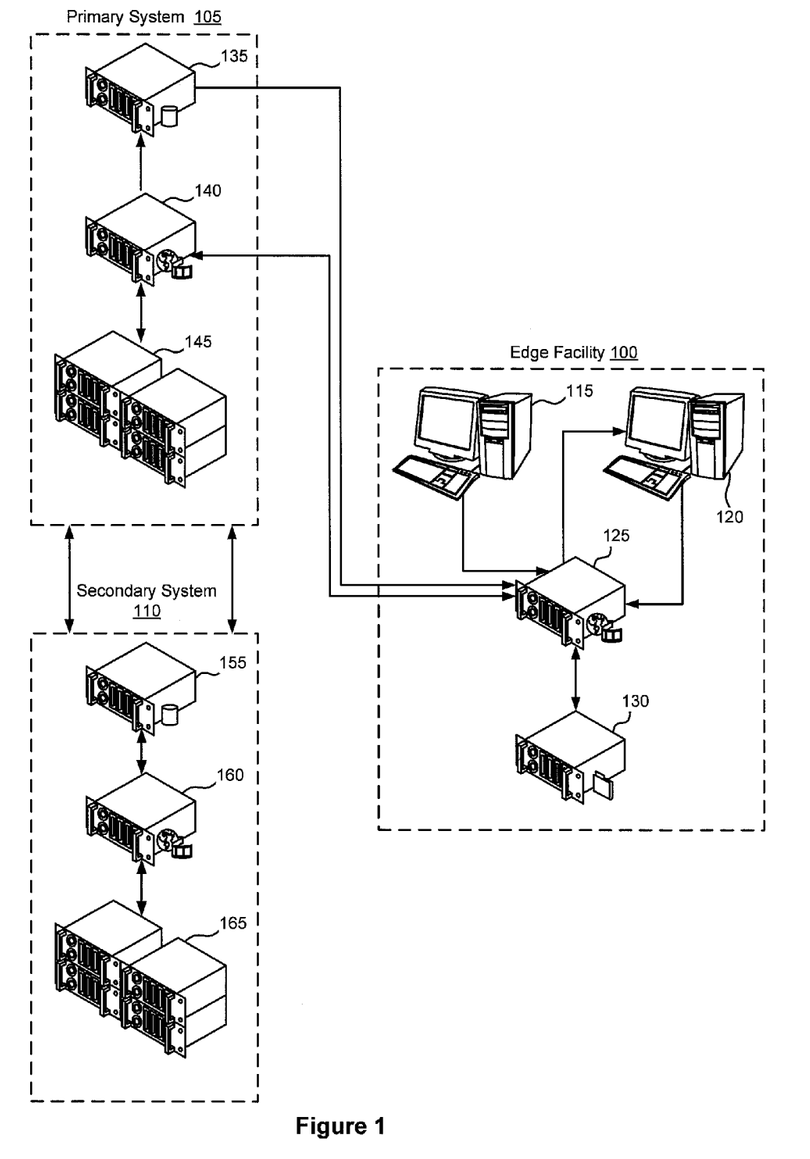
FIG. 1 is one example embodiment of a system having an edge facility, a primary system and a secondary system.

FIG. 1 is an example embodiment of a system having an edge facility 100, a primary system 105 and a secondary system 110. Edge facility 100 may include a content source 115, a content consumer 120, a cache repository 125 and storage interface 130. Primary system 105 may include a registry 135, an active central repository 140 and a vendor neutral archive (VNA) 145. Secondary system 110 may include a passive backup registry 155, a passive backup repository 160 and a passive VNA 165. In one example embodiment, the system may be an XDS network able to facilitate registration, distribution and access of content across health enterprises.

Edge facility 100 may be one of a plurality of edge facilities connected to primary system 105 and secondary system 110, and edge facility 100 as described herein is illustrative and should not be considered limiting. In one example embodiment, the XDS system of FIG. 1 may consist of multiple cache repositories 125 from multiple edge facilities 100 that forward content and metadata to primary system 105.

Edge facility 100 may be one of many edge facilities that are from a group of healthcare enterprises belonging to an affinity domain. In the affinity domain, a group of healthcare enterprises (e.g. edge facilities 100) may have a mutual agreement to work together and communicate content to and from each other using a common set of policies and XDS-based infrastructures for sharing patient clinical content. Each of edge facilities 100 may be designed to accommodate information such as, for example, patient identification and consent, as well as to control access to the information and to create a consistent representation of the information.

Edge facility 100 facilitates creation, registration, distribution and access of content such as, for example, patient electronic health records across health enterprises. Edge facility 100 may be a network of one or more computing devices that includes content source 115, content consumer 120, a cache repository 125 and storage interface 130.

The computing devices may be connected in a local area network (LAN) through one or more communication means in order to transmit and request content between each other. Other networks such as, WAN and wireless, among others, may also be utilized, as will be known in the art, to connect the computing devices in edge facility 100. In alternative example embodiments, any point of care may act as one of content source 115 or content consumer 120.

Content source 115 refers to a producer of content that may utilize a computing device to create and submit content for registration and/or storage. In one example embodiment, content source 115 may be a computing device used to generate the content. In another example embodiment, content source 115 may be an organization that delivers care such as, for example, a physician's office or a hospital. For example, content sources 115 may be a desktop or laptop computer, a barcode scanner, a scanner, a copier, a tablet computer, or a mobile device, among many others.

Content source 115 may be an imaging content source. Imaging content sources may be imaging devices that generate imaging assets (e.g. medical images) that may be made available to content consumer(s) 120. For example, imaging content sources may be medical imaging equipment such as MRI, X-Ray, ultrasound machines, mammography, CT scan and many others. When an imaging content source wishes to share a set of instances (e.g., medical images), it constructs a DICOM manifest that references the instances that are to be shared. The generated manifest and associated image-specific metadata may then be submitted to cache repository 125.

Content source 115 may perform at least one of the following: generation and submission of content and associated metadata to cache repository 125 and/or active central repository 140; submission of content as an addendum to another content already present in at least one of active central repository 140, cache repository 125 and passive backup repository 160; submission of content as an alteration of another content already present in at least one of active central repository 140, cache repository 125 and passive backup repository 160; creation of a folder in cache repository 125; and adding of one or more files or content to a folder in cache repository 125.

Content consumer 120, on the other hand, queries and/or retrieves content from cache repository 125. Content consumer 120 may generate query messages using metadata associated with the content and send the query messages to registry 135 for retrieval of content that may be stored in cache repository 125 or active central repository 140, or in some cases that will be described below, in passive backup repository 160. In one example embodiment, content consumer 120 may be a computing device that is used to query and/or retrieve content from any of the available repositories connected to edge facility 100.

Content consumer 120 may be an imaging document consumer. An imaging document consumer may query registry 135 for previously published and/or submitted images and retrieve the desired manifest document associated with the requested images. It may then decode the manifest and extract identifiers that uniquely identify the available images. Content consumer 120 may retrieve the images from the imaging document repository (e.g. cache repository 125, active central repository 140, and passive backup repository 160). The images retrieved by content consumer 120 may be DICOM images. Content consumers 120 may be computing devices such as, but not limited to, a desktop or laptop computer, a barcode scanner, a scanner, a copier, a tablet computer and a mobile device.

Cache repository 125 is a component of an XDS system located in edge facility 100 used to store content and respond to content retrieval requests. Cache repository 125 may be a computing device having a database for storing organized collection of data, content or documents. In one example embodiment, cache repository 125 may refer to a data storage device having a computer-readable storage medium to store content.

Cache repository 125 may receive content and associated metadata from content source 115, store the received content, and forward content to content consumer 120 in response to queries made by content consumer 120. In alternative example embodiments, cache repository 125 may also enhance submitted metadata with existing cache repository 125 information to enable and/or improve retrieval of the content at a later time. The enhanced metadata may also be forwarded by cache repository 125 to registry 135.

Content stored in cache repository 125 may be returned directly to content consumer 120. For content not stored in cache repository 125 but identified to be available in active central repository 140, the content may be retrieved and stored to cache repository 125 then returned from cache repository 125 to content consumer 120. In alternative example embodiments, content not on cache repository 125 may be automatically retrieved from active central repository 140 to cache repository 125. In one example embodiment, cache repository 125 may be the storage medium that directly interfaces with content source 115 and content consumer 120 to receive, store and send content generated in edge facility 100.

Cache repository 125 may store content received from content source 115 for a specified number of days before deleting the content. Deleting stored content after a specified number of days allows for more space to be utilized in cache repository 125 for storing more pertinent content that may be used or needed in edge facility 100. The number of days for storing the content may be specified by a user of edge facility 100 (e.g. administrator), or may be pre-set. The content may be deleted from cache repository 125 after the content has been forwarded to active central repository 140 for a more long-term storage.

In an alternative example embodiment, content may be deleted from cache repository 125 after a high water mark is reached and after the content has been forwarded successfully to active central repository 140. If content consumer 120 requests a content that has been deleted in cache repository 125, cache repository 125 may retrieve the requested content from active central repository 140, as will be discussed in greater detail below. In an alternative example embodiment, cache repository 125 may retrieve content and return the content to content consumer 120 prior to content consumer 120 specifically requesting for the content. This method may be referred to as a prefetching process, and will be discussed in greater detail below.

Cache repository 125 may also include a registry proxy interface (not shown) and a repository proxy (not shown). Content consumers 120 perform an XDS StoredQuery transaction using the registry proxy. The registry proxy sends a query request to registry 135 and receives the query results from registry 135. The registry proxy then morphs the result RepositoryUniqueID of each document from active central repository 140 uniqueID to the cache repository 125 uniqueID. This allows content consumers 120 to retrieve content from the cache repository proxy. In one example embodiment, registry 135 only knows about active central repository 140.

The repository proxy has two interfaces: the store interface and the retrieve interface. The store interface (Provide and Register) is for content sources 115 and stores content in cache repository 125 and performs Cross-Enterprise Document Reliable Interchange (XDR) transactions to the active central repository 140, as will be described below.

Retrieve interface is for content consumers 120 and retrieves content if content is available in cache repository 125. If the content is not available in cache repository 125, retrieve interface goes to active central repository 140 to retrieve the content, caches the content in cache repository 125 and returns content to content consumer 125.

Cache repository 125 with proxy (not shown) may provide XDS document ingestion and retrieval operations for one or more content sources 115 and content consumers 120 at edge facility 100 using one or more XDR transactions. For XDS document ingestion, content source 115 submits "Provide and Register" SubmissionSet to cache repository 125 that stores content locally at edge facility 100 without performing a "Register Document Set" to registry 135. Cache repository 125 then forwards the SubmissionSet via a "Provide and Register" transaction to active central repository 140 that performs the "Register Document Set" to registry 135. If the "Provide and Register" transaction fails on at least one of cache repository 125 or active central repository 140, the content fails to be stored in at least one of primary system 105 and edge facility 100, and an error is returned to content source 115.

For document retrieval, content consumer 120 issues all "Retrieve Document Set" requests to a repository proxy interface on cache repository 125. The repository proxy interface may appear as a normal repository interface but with additional internal functionalities for accessing active central repository 140. If a document requested by content consumer 120 is in cache repository 125, then the "local" document is returned to content consumer 120. If the requested document is not locally cached, then the repository proxy interface in cache repository 125 will retrieve the document from active central repository 140 then cache the document in cache repository 125, and then return the document to content consumer 120.

For document query, a registry proxy interface (not shown) in edge facility 100 may be provided. The function of a registry proxy interface is to pass a "Stored Query" function request to registry 135 and then intercept the "Stored Query" results in order to return the Repository Unique ID of cache repository 125 to content consumer 120 and intercept the hostname of cache repository 125 in the retrieve URI, to return results of the document query to content consumer 120.

With continued reference to FIG. 1, edge facility 100 may also include a storage interface 130. Storage interface 130 may be a system component that XDS leverages to manage the physical storage of content. Storage interface 130 may manage a traditional disk storage medium. In alternative example embodiments, storage interface 130 may archive content to a content-addressable storage (CAS) device (not shown) and storage interface 130 may retrieve a requested content back from the disk storage if the content is identified to be archived in the CAS. Storage interface 130 may be a vendor-neutral archive (VNA) component for image storage, and cache repository 125 may use an instance of storage interface 130 as the VNA since the storage application can be configured for XDS content or for VNA images.

In one example embodiment, active central repository 140 and passive backup repository 160 may each have a storage interface instance. Active central repository 140 and passive backup repository 160 may store content to their own storage interface instance, and the storage interface may replicate the content between primary system 105 and secondary system 110 (e.g., from active repository storage interface to backup repository storage interface).

Content source 115, content consumer 120, cache repository 125, and storage interface 130 may be connected to each other via a network using a direct cable or optical connection, or by a network connection such as, for example, an Ethernet local area network (LAN). The connection between each of the components in edge facility 100 may be established by an Internet connection, or via a wide area network (WAN). Communication links between the components and the network that connects them to each other may be established by using standard electrical cabling or bus structures. The communication links may also be established using wireless connections.

In a networked environment, program modules depicted relative to the components, or portions thereof, may be stored in local or remote memory storage devices and may be linked to various processing devices for performing certain tasks. It will be appreciated that the network connections described are example embodiments and other means of establishing a communications link between content source 115, content consumer 120, cache repository 125, and storage interface 130 in edge facility 100 may be used.

Edge facility 100 may be communicatively connected to primary system 105 and secondary system 110 for storing, querying and retrieval of content. In one example embodiment, edge facility 100, primary system 105 and secondary system 110 may be connected using XDR. XDR may provide a method for interchanging content, objects or instances using a point-to-point reliable messaging system. XDR allows direct interchange between healthcare image-capable systems. It will be appreciated that XDR provides a reliable and automatic transfer of content and metadata for one patient between edge facility 100, primary system 105 and secondary system 110. In one example embodiment, content may be forwarded to central active repository 140 from cache repository 125 through XDR.

Primary system 105 may be a system of computing devices that is connected to edge facility 100 by one or more communication links, as will be known in the art. Primary system 105 may comprise of a registry 135, an active central repository 140 and an active VNA 145. Content and metadata from cache repositories 125 of one or more edge facilities 100 may be forwarded to primary system 105 for storage and registration to active central repository 140 and registry 135, respectively. Primary system 105 may be an active system that processes client requests from edge facility 100. After processing a request (e.g. storing of new content and/or metadata), primary system 105 may update and replicate content and metadata into passive backup registry 155, passive backup repository 160, and passive VNA 165 on secondary system 110. If primary system 105 fails, secondary system 110 may take its place as the active system that processes requests from edge facility 100.

Primary system 105 may store information that goes beyond standard clinical data collected in a single provider's office and instead store data from multiple edge facilities 100 (e.g. providers). Primary system 105 may also share information with one or more health care providers such as, for example, specialists and laboratories, and content stored in primary system 105 may be created and managed by authorized providers across more than one healthcare organization.

Registry 135 may be a database for registering and/or storing metadata associated with content created by content source 115 and stored in at least one of cache repository 125 and active central repository 140. Metadata storage may be performed in registry 135 in order for content of interest (e.g., content used for the care of a patient) to be easily found, selected and retrieved from at least one of cache repository 125 and active central repository 140. Metadata stored in registry 135 may be a collection of information received from content source 115 that allows an application such as, for example, a computer program, to quickly select desired metadata. Registry 135 may organize metadata using fields and records in a database. In an alternative example embodiment, accessing metadata stored in registry 135 may be performed using a database management system (DBMS), or any other collection of programs that enables a user to enter, organize, and select stored data.

Active central repository 140 may be a database for storing one or more content forwarded by cache repository 125 in edge facility 100. Active central repository 140 and cache repository 125 may be communicatively connected to each other to manage content during one or more processes such as, for example, the searching and retrieving of stored content using the metadata. Metadata stored in registry 135 and content stored in active central repository 140 may be automatically replicated to passive backup registry 155 and passive backup repository 160 in secondary system 110, respectively, and as will be discussed in greater detail below.

VNA 145 may be a computing device having a database for managing content in edge facility 100. VNA 145 may also be used to manage manifest content in edge facility 100. VNA 145 may store and/or archive documents, files, images and other content of relevant clinical data in a standard format across healthcare enterprises, such that the stored content may be accessed by other systems in a vendor-neutral manner. In an alternative example embodiment, VNA 145 may be considered a medical device used for storing clinical content. In another alternative example embodiment, VNA 145 may be optional in the system and may be present only if Cross-Enterprise Document Sharing for Imaging (XDS-I) is used.

Vendor neutrality of VNA 145 may refer to the use of a standard interface and format such that devices may produce or consume content regardless of vendor-specific devices that are used to generate or utilize the content. Vendor neutrality of VNA 145 may provide a scalable image and information management for medical content so that content may be queried stored, and retrieved using a specified framework defined by open standards at multiple enterprises and departments while still maintaining the privacy, security and integrity of the content.

XDS-I may be a framework that extends XDS to share medical images, diagnostic reports and related information across an enterprise of care sites. XDS-I may provide a solution for publishing, querying and retrieving image assets across a group of affiliated enterprises. XDS-I may be used when VNA 145 stores a manifest document of diagnostic imaging references into XDS to allow VNA-stored images to be shared using XDS. A standard XDS-I workflow includes one or more content consumers 120 retrieving a manifest document of image references and then viewing actual images from VNA 145. A manifest document may be an instance of a DICOM class, which describes and collects a set of DICOM images that are intended for sharing. If a system uses XDS-I, manifest documents may be submitted directly to active central repository 140.

In one example embodiment, DICOM image metadata is also stored in VNA 145 along with actual DICOM images. XDS-I also stores a manifest document for each VNA DICOM study into active central repository 140. The manifest document contains DICOM study/series/images UIDs as well as DICOM retrieve location in VNA 145. With XDS-I, content consumer 120 retrieves the manifest document with DICOM UIDs from active central repository 140 then retrieves the actual DICOM images for viewing from VNA 145.

In alternative example embodiments, manifest documents may be pushed to cache repository 125 using on-demand proxy retrieve and/or pre-fetching, as will be discussed in greater detail below.

Registry 135, active central repository 140 and VNA 145 in primary system 105 may be connected to each other via a network using a direct cable or optical connection, or by a network connection such as, for example, an Ethernet local area network (LAN). The connection between each of the components in primary system 105 may be established by an Internet connection, or via a wide area network (WAN). Communication links between the components and the network that connects them to each other may be established by using standard electrical cabling or bus structures. The communication links may also be established using wireless connections. In a networked environment, program modules depicted relative to the components, or portions of registry 135, active central repository 140 and VNA 145, may be stored in local or remote memory storage devices and may be linked to various processing devices for performing certain tasks. It will be appreciated that the network connections described are example embodiments and other means of establishing a communications link between registry 135, active central repository 140 and vendor neutral archive 145 may be used.

Secondary system 110 may be a passive system comprising a passive backup registry 155, a passive backup repository 160 and a passive VNA 165. The secondary system 110 may serve as a backup system to which primary system 105 replicates its information, including content and metadata. Secondary system 110 is connected to edge facility 100 using one or more communication links, as will be known in the art. Edge facility 100 may retrieve one or more content from secondary system 110 if cache repository 125 is determined to not contain content needed by content consumer 120, and/or if connection to active central repository 140 may not be established, as will be discussed in greater detail below.

Passive backup repository 160 may be a computing device having a database for storing one or more content forwarded by cache repository 125 in edge facility 100. Passive backup registry 155 in secondary system 110 may be a database for storing registered metadata associated with content stored in at least one of active central repository 140 and cache repository 125. Passive backup repository 160 and passive backup registry 155 may be communicatively connected to each other for managing content during one or more processes such as, for example, searching and retrieving of stored content using the metadata by content consumer 120 in edge facility 100.

Passive VNA 165 may be a database that is replicated from active VNA 145 database as a high availability function of active VNA 145. Replication of the databases may be performed automatically during a predetermined schedule, or may be initiated by a user of the XDS system. In an alternative example embodiment, replication of the databases may be performed every time an update (e.g., storing of new content and metadata, updating or deleting of stored content and metadata) in active central repository 140 is performed.

Figure 2:
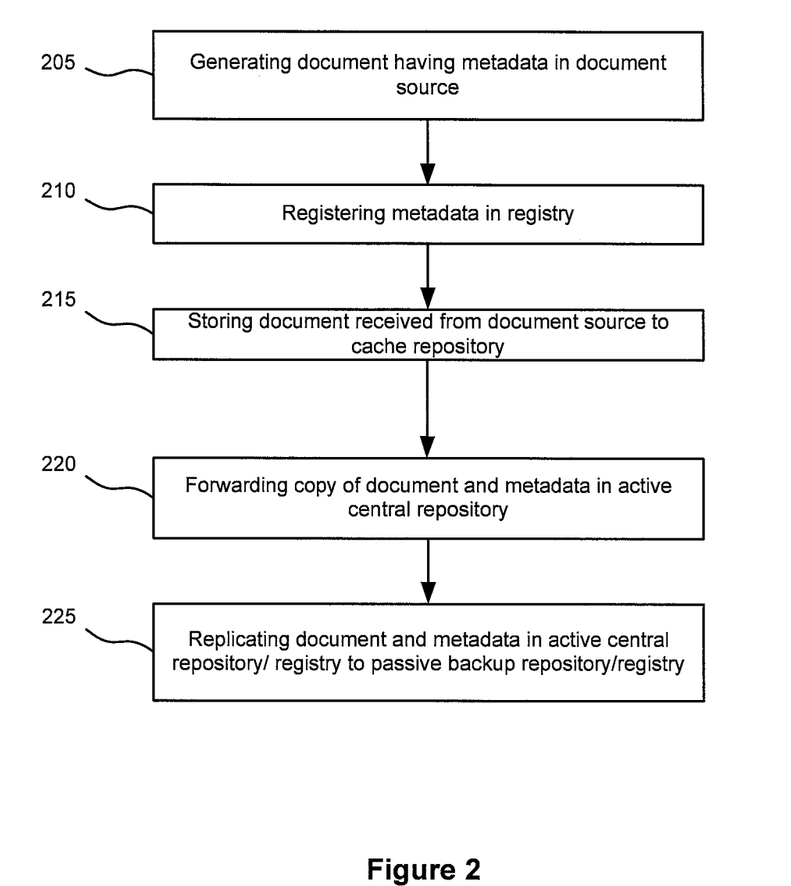
FIG. 2 is one example method of managing content in conjunction with the system described in FIG. 1.

FIG. 2 is one example method of managing content in conjunction with the system described in FIG. 1. This example method includes receiving content in edge facility 100, registering metadata of the received content in primary system 105, transmitting the content from edge facility 100 to primary system 105, and replicating the content and metadata stored in primary system 105 to secondary system 110.

At block 205, content having metadata may be generated from content source 115. In one example embodiment, the content may be an EMR created by content source 115 which may include standard clinical and medical data gathered and/or generated in a provider's office. Generating content having metadata may include receiving data from one or more devices such as, for example, a scanner that generates images having metadata, medical imaging equipment that generates DICOM images, or any other computing device such as, for example, a laptop computer, a tablet, a mobile phone and other devices capable of producing content, as will be known in the art.

For example, a physician in a clinic may request one or more tests to be performed on a patient such as, for example, an x-ray test. The request may be digitized and generated using a computing device. For illustrative purposes, the computing device used by the physician to generate the request for an x-ray test may be content source 115, and the document containing the orders for test may be the generated content, while information contained in document such as, for example, name of patient, order for test, physician's name, clinic the patient was checked, may be the metadata associated with the generated content.

At block 210, metadata associated with the content may be registered in registry 135. Registering metadata in registry 135 may include transmitting the metadata to registry 135 in primary system 105 through one or more communication links as will be known in the art. The registering may include inserting the metadata associated with the generated content into one or more columns in a database in registry 115. Registering metadata of the content in the registry 135 may be performed to facilitate easier, faster and more efficient search, retrieval and modification of content by content consumer 120.

For example, after the physician has generated the content containing an order for an x-ray test, the physician may send the content to a remote server such as, registry 135 in primary system 105, which will receive the EMR, extract metadata associated with the EMR, and register the extracted metadata to registry 135. In an alternative example embodiment, the metadata may be directly sent to registry 135. Extracting and registering the metadata may be performed automatically using one or more computer instructions in registry 135, or may be performed by an authorized user using registry 135.

At block 215, cache repository 125 may receive the content from content source 115 and store the received content on a non-transitory computer storage medium in cache repository 125. In one example embodiment, cache repository 125 may be the non-transitory computer storage medium. For example, the EMR generated by the content source 115 in the physician's office may be sent to cache repository 125 from content source 115 in the physician's office through one or more network connections. Cache repository 125 may then store the received EMR.

Storing of the content in the cache repository 125 may be set for a number of days and may be automatically deleted after the predetermined number of days. For example, cache repository 125 may be set to store content for ten days, after which the content may be deleted and removed from the storage medium of cache repository 125. This automatic deletion may be performed to clear up space in the storage medium of cache repository 125 for new content. In an alternative example embodiment, the deletion of content from the cache repository 125 may be initiated by a user of the system. The content is stored or archived in active central repository 140 in primary system 105 prior to removal of the content from the cache repository 125.

At block 220, a copy of the content and metadata may be forwarded from cache repository 125 to active central repository 140 in primary system 105. A copy of the content and metadata may be forwarded to primary system 105 as a backup copy to be used when cache repository 125 may be unavailable to content consumer 120 for retrieval of a requested content. Forwarding of the copies may be performed automatically with or without a predetermined time interval. A predetermined time interval for forwarding of the copies may be set by an authorized user (e.g., an administrator) of edge facility 100.

At block 225, the content and metadata forwarded to registry 135 and active central repository 140 in primary system 105 may be replicated to passive backup registry 155 and passive backup repository 160 in secondary system 110, respectively. Replication of the content and metadata may be performed automatically. In an alternative example embodiment, replication may be automatically performed in one or more time intervals which may or may not be set by an authorized user of the example system.

Replication between primary system 105 and secondary system 110 involves the sharing of content and metadata to ensure consistency between the two systems and improve accessibility, reliability and fault tolerance between the XDS system. Replication of the content and metadata from primary system 105 to secondary system 110 may be a database replication performed using a database management system. In one example embodiment, the replication may include a master/slave relationship between the original and the copies stored in primary system 105 and secondary system 110, respectively. Primary system 105 may log updates in at least one of registry 135, active central repository 140 and vendor neutral archive 145, and the changes and/or updates in primary system 105 ripples or replicates through to devices in secondary system 110. Secondary system 110 may notify primary system 105 that the update has been received and applied in secondary system 110 successfully, in order to allow the sending of newer, subsequent updates, or the re-sending of updates until successfully applied in secondary system 110. In another example embodiment, secondary system 110 may replicate back to active central repository 140 and registry 135 in primary system 105, wherein primary system 105 and secondary system 110 sync back up when primary system 105 becomes online after a downtime period. Other methods of replication may also be used between primary system 105 and secondary system 110, as will be known in the art.

Figure 3:
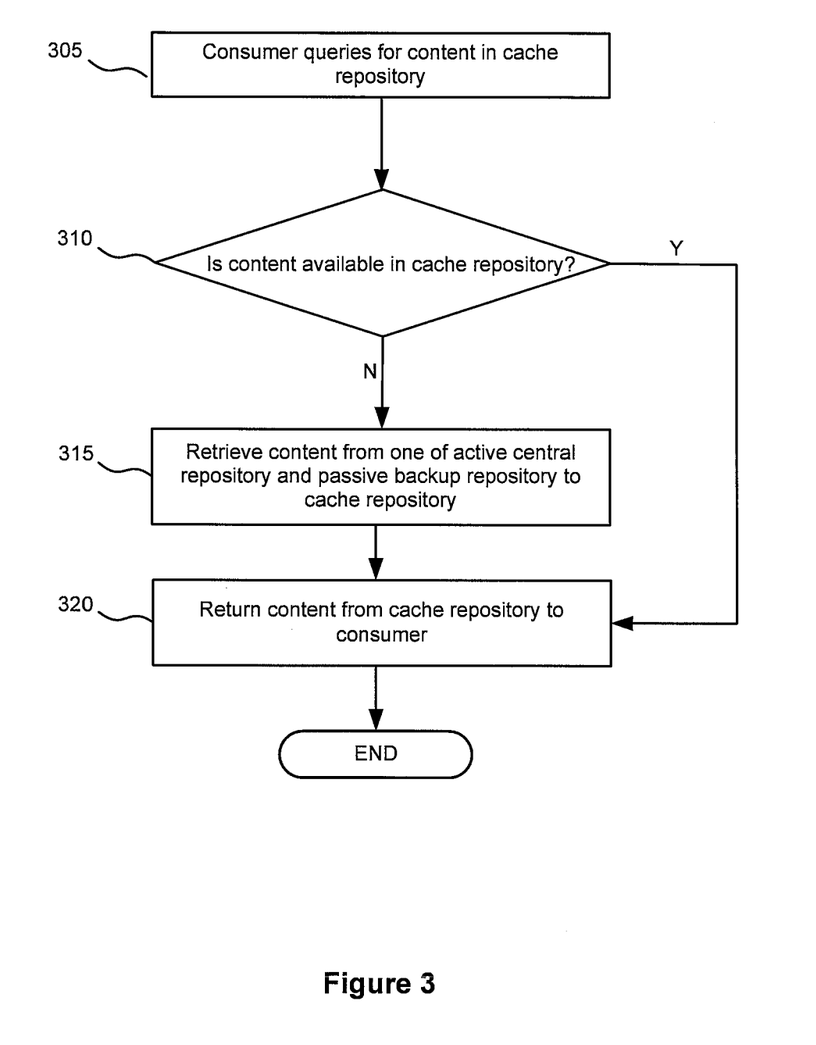
FIG. 3 is one example method for searching and retrieving content from a repository for use by a content consumer.

FIG. 3 is one example method for searching and retrieving content from a repository for use by content consumer 120. This example method includes querying for a content using a metadata by content consumer 120, determining whether the document is retrievable from a number of repositories connected to content consumer 120 and retrieving the content from an available repository of the number of connected repositories, which may be cache repository 125, active central repository 140, and passive backup repository 160.

At block 305, content consumer 120 in edge facility 100 queries for content in cache repository 125. In one example embodiment, querying for the content may be performed via a registry proxy on cache repository 125. Querying for the content may include submitting a request to retrieve the content and includes submitting one or more search terms to registry 135. The search terms may then be used to search for the associated content having an associated metadata in registry 135 that matches the one or more search terms. For example, if one or more content for a patient named "John Smith" is requested, patient ID associated with the patient name may be submitted by content consumer 120 to registry 135 to determine if cache repository 125, or any other repositories in the system, contains content having "John Smith" metadata.

At block 310, it is determined if the content is available in cache repository 125. Determining if the content is retrievable in cache repository 125 includes identifying whether the requested content is stored in cache repository 125 at the time of the retrieval request from content consumer 120.

If the content is not available in cache repository 125, the requested content may be retrieved from active central repository 140 and locally cached to cache repository 125 (block 315) and then returned to content consumer 120 (block 320). The requested content may be determined to be unavailable in cache repository 125 at the time of the retrieval request when the content has been deleted from cache repository 125. For example, the content may have been deleted from cache repository 125 after a specified number of days have passed.

Retrieval of the requested content from active central repository 140 to cache repository 125 may be performed if a connection is established between cache repository 125 and active central repository 140. A connection is established between cache repository 125 and active central repository 140 if the active central repository 140 is in an uptime condition such as, for example, when active central repository 140 is determined to be working and available.

In an alternative example embodiment, active central repository 140 may be determined to be in a downtime condition such as, for example, during partial or complete site failures, or when active central repository 140 is in a scheduled or unscheduled downtime (e.g. maintenance). If active central repository 140 is in a downtime condition, and content consumer 120 is requesting for content not available in cache repository 125, cache repository 125 may retrieve the requested content from passive backup repository 160. Retrieving content from passive backup repository 160 may include sending the one or more search terms to passive backup registry 155 in order to search and retrieve the requested content from passive backup repository 160. Cache repository 125 may then locally cache the document retrieved from passive backup repository 160 and return the retrieved document to content consumer 120.

If the content is determined to be available in cache repository 125, consumer may retrieve the content from cache repository 125 and provide it to content consumer 120 (block 320).

In another alternative example embodiment, retrieval may be performed using a registry proxy interface on cache repository 125 to query for the content, before and after content has been deleted. Cache repository 125 may include a registry proxy interface that morphs query results from central active repository 140 to show the content as residing on cache repository 125. In still another alternative example embodiment, retrieval of content from cache repository 125 and central active repository 140 may also be performed through a repository proxy interface on cache repository 125.

Figure 4:
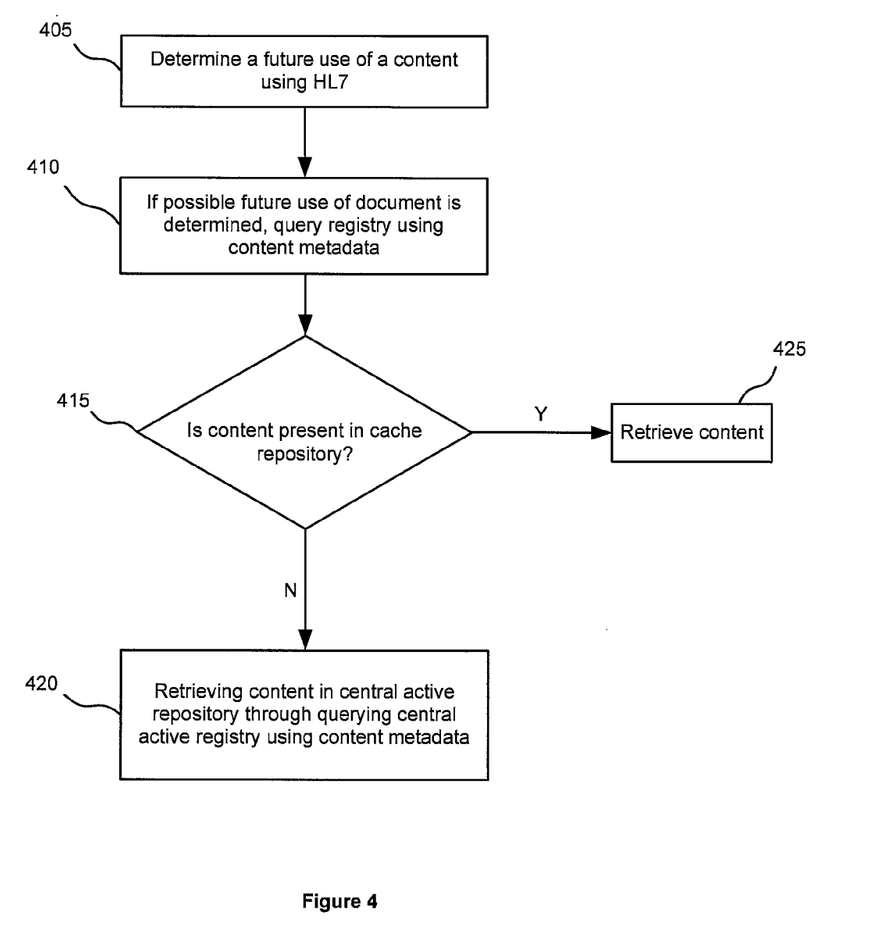
FIG. 4 is one example embodiment of a method of retrieving content in central active repository to cache repository prior to use of the content.

FIG. 4 is one example embodiment of a method of retrieving content in central active repository 140 to cache repository 125 prior to use of the content. In an alternative example embodiment, the content may be retrieved from central active repository 140 to cache repository 125 prior to a retrieval request from content consumer 120.

For illustrative purposes, the example method of FIG. 4 may be referred to herein as an example content pre-fetching method. Pre-fetching may be performed when content determined to have a possible future use is identified to be unavailable from cache repository 125, and thus, have to be "pre-fetched" from active central repository 140 or passive backup repository 160 prior to the possible future use. Pre-fetching may be performed to facilitate a faster retrieval of content by content consumer 120 when the need for the content arises. In one example embodiment, pre-fetching may be implemented at primary system 105, but a post-fetch of relevant content from active central repository 140 may still be performed when new content is stored in cache repository 125.

At block 405, a future use of content may be determined by utilizing one or more processes under Health Level Seven (HL7) standards. HL7 is a standard for information exchange and management between medical enterprises and applications. HL7 defines a format for the transmission of electronic medical records and other health-related information, and using the HL7 standard, multiple healthcare systems are able to interact and share information with each other.

Medical records and health-related information sent using the HL7 standard may be a collection of one or more messages, with each message transmitting one health-related item of information or electronic medical record. Examples of messages that may be transmitted using the HL7 format include, but are not limited to, patient records, billing information, laboratory records, as well as information about a specific event such as, for example, a patient admission and/or a check-ups.

Determining a possible future use of content may be performed by having an application track HL7 messages and predict, using the broadcasted messages, whether or not one or more content associated with a particular patient may be needed at a pre-determined future time. Predicting a probable use of content using the broadcasted messages may be performed by scanning the content of the broadcasted messages for one or more terms which may be associated with relevant information such as, for example, a patient name or identifier. Typically, a prefetch is triggered by a HL7 Order Message (ORM). The ORM may contain information that may be used to predict possible future content such as, for example, patient ID, scheduled procedure data, and facility code.

At block 410, if future use of content is determined to be probable, a query may be sent to registry 135 using one or more search terms targeted to locate the content in an available repository using the content metadata.

If content is not available in cache repository 125 (block 415), the content is searched for and retrieved from active central repository 140 and sent to cache repository 125 for storage (block 420). If content is available in cache repository 125, the document may be retrieved from cache repository 125 and returned to content consumer 120 (at block 425). It will be apparent that retrieving content in the example pre-fetching method described in blocks 420 and 425 of FIG. 4 may utilize the example retrieving method described in FIG. 3.

Retrieving content from one of active central repository 140 and passive backup repository 160 to cache repository 125 may be performed in order to allow consumer to efficiently and quickly retrieve the content when the need arises. In one example embodiment, the retrieval of the content from one of active central repository 140 and passive backup repository 160 is performed prior to consumer making a request of the content. In an alternative example embodiment, the number of content to be pre-fetched or automatically retrieved may be configurable.

For example, if at least one broadcasted message is identified to indicate a probable future need of content tagged with "John Smith", a query for content associated with "John Smith" may be sent to registry 135 in order to locate and retrieve associated content stored in active central repository 140. In alternative example embodiments, wherein primary system 105 is determined to be in downtime condition, the query for content may be sent to secondary system 110, specifically to passive backup registry 155 to locate and retrieve the associated content stored in passive backup repository 160.

In one example embodiment, active central repository 140 and/or registry 135 may have no knowledge of the edge facilities 100 unless content pre-fetching is implemented at primary system 105.

It will be understood that the example applications described herein are illustrative and should not be considered limiting. It will be appreciated that the actions described and shown in the example flowcharts may be carried out or performed in any suitable order. It will also be appreciated that not all of the actions described in FIGS. 2-4 need to be performed in accordance with the example embodiments of the disclosure and/or additional actions may be performed in accordance with other embodiments of the disclosure.

Many modifications and other example embodiments of the disclosure set forth herein will come to mind to one skilled in the art to which these disclosure pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of managing content and associated metadata in a network by a cache repository, comprising:
    receiving the content and the associated metadata from a content source located in a local network of an edge facility;
    storing the content in the cache repository located in the local network of the edge facility;
    sending the content to an active repository remote from the local network of the edge facility for storage;
    registering the associated metadata in an active registry remote from the local network in the edge facility;
    replicating the content from the active repository to a backup repository remote from the local network of the edge facility and the active repository;
    replicating the associated metadata from the active registry by registering the associated metadata to a backup registry remote from the local network of the edge facility and the active registry;
    receiving a request to retrieve the content from a content consumer in the local network in the edge facility;
    upon receiving the request to retrieve the content, determining if a connection to the active repository can be established in the network;
    if the connection to the active repository can be established, retrieving by the cache repository the content from the active repository and returning the content to the content consumer; and
    if the connection to the active repository cannot be established, retrieving the content from the backup repository.

2. The method of claim 1, wherein retrieving the content from at least one of the active repository and the backup repository is performed through cross-enterprise document reliable interchange (XDR).

3. The method of claim 1, wherein the replicating the content to the backup repository is performed in a predetermined time interval.

4. The method of claim 1, wherein the replicating the received content to the backup repository is performed automatically when the active repository receives the content from the cache repository.

5. The method of claim 1, wherein the retrieving the content from the active repository is performed through a repository proxy interface on the cache repository.

6. The method of claim 1, further comprising querying to the active repository prior to retrieving the content from the active repository.

7. The method of claim 6, wherein the querying to the active repository is performed through a registry proxy interface on the cache repository.

8. The method of claim 1, further comprising retrieving and storing to the cache repository content stored in the active repository but not in the cache repository.

9. The method of claim 1, further comprising storing the content retrieved from the active repository to the cache repository.

10. The method of claim 9, further comprising returning the content stored to the cache repository to the content consumer.

11. The method of claim 1, further comprising deleting the stored content from the cache repository after a predetermined number of days.

12. The method of claim 11, wherein the stored content is deleted from the cache repository after the content has been sent to the active repository for storage.

13. The method of claim 1, wherein the storing the content in the cache repository includes storing the content in an XDS repository.

14. A system of managing one or more content having metadata, comprising:
    an edge facility comprising:
        a content source for generating the one or more content having the metadata;
        a cache repository for storing content received from the content source; and
        a content consumer for requesting the one or more content having the metadata;
    a primary system remotely connected to the edge facility, comprising:
        a central repository for receiving and storing the content from the cache repository; and
        a central registry remotely connected to the edge facility for registering the content using the metadata;
    a backup system remotely connected to the primary system and the edge facility, comprising:
        a backup repository for storing a backup of the content received and stored in the central repository; and
        a backup registry for storing a backup of the metadata registered in the central registry, wherein upon the cache repository receiving a request for the content from the content consumer, determining by the cache repository if a connection to the primary system can be established; upon determining by the cache repository that the connection to the primary system can be established, retrieving by the cache repository the content from the central repository; and if the connection to the primary system cannot be established, the cache repository retrieves the content requested by the content consumer from the backup repository.

15. The system of claim 14, wherein the content stored in the central repository is replicated to the backup repository.

16. The system of claim 14, wherein content stored in the central repository but not in the cache repository is retrieved and stored to the cache repository.

17. The system of claim 14, wherein the content retrieved from the central repository is stored in the cache repository, and returned to the content consumer from the cache repository.

18. The system of claim 14, wherein the cache repository, the central repository and the backup repository are XDS repositories.

19. The system of claim 14, wherein the central registry and the backup registry are XDS registries.

* * * * *